United States Patent [19]

Heitland et al.

[11] 4,112,878

[45] Sep. 12, 1978

[54] INTERNAL COMBUSTION ENGINE WITH A MAIN COMBUSTION CHAMBER AND AN AUXILIARY COMBUSTION CHAMBER

[75] Inventors: Herbert Heitland; Udo Renger, both of Wolfsburg, Fed. Rep. of Germany

[73] Assignee: Volkswagenwerk Aktiengesellschaft, Fed. Rep. of Germany

[21] Appl. No.: 624,924

[22] Filed: Oct. 22, 1975

[30] Foreign Application Priority Data

Oct. 23, 1974 [DE] Fed. Rep. of Germany ....... 2450305

[51] Int. Cl.² .............................................. F02B 19/10
[52] U.S. Cl. ................... 123/32 ST; 123/1 A; 123/32 J; 123/32 SP; 123/191 S
[58] Field of Search ............. 123/32 ST, 32 SP, 32 J, 123/1 A, 3, 191 S, 191 SP, 75 B

[56] References Cited

U.S. PATENT DOCUMENTS

| | | | |
|---|---|---|---|
| 1,181,122 | 5/1916 | Eastman | 123/143 B |
| 1,957,541 | 5/1934 | Johnson | 123/32 SP X |
| 2,121,920 | 6/1938 | Mallory | 123/32 ST |
| 2,152,196 | 3/1939 | Kokatnor | 123/1 A X |
| 2,603,557 | 7/1952 | Roush | 123/127 |
| 3,508,530 | 4/1970 | Clawson | 123/191 |
| 3,866,579 | 2/1975 | Serruys | 123/25 A |
| 3,884,211 | 5/1975 | Yagi et al. | 123/32 J |
| 3,908,606 | 9/1975 | Toyoda et al. | 123/3 |
| 3,921,607 | 11/1975 | Kawamoto | 123/32 J X |
| 3,999,532 | 12/1976 | Kornhauser | 123/32 SP |

FOREIGN PATENT DOCUMENTS

| | | | |
|---|---|---|---|
| 2,212,553 | 9/1973 | Fed. Rep. of Germany | 123/1 A |
| 442,340 | 2/1936 | United Kingdom | 123/32 J |

Primary Examiner—Charles J. Myhre
Assistant Examiner—Tony M. Argenbright
Attorney, Agent, or Firm—Brumbaugh, Graves, Donohue & Raymond

[57] ABSTRACT

A spark ignited internal combustion engine includes a main combustion chamber, an auxiliary combustion chamber connected to the main combustion chamber, and fuel delivery means for supplying separate partial quantities of fuel to the main combustion chamber and auxiliary combustion chamber. Since the auxiliary combustion chamber is maintained at an elevated operating temperature and the partial quantity of fuel delivered to the auxiliary combustion chamber is an easily dissociable fuel, thermal dissociation of the easily dissociable fuel may occur prior to ignition.

10 Claims, 1 Drawing Figure

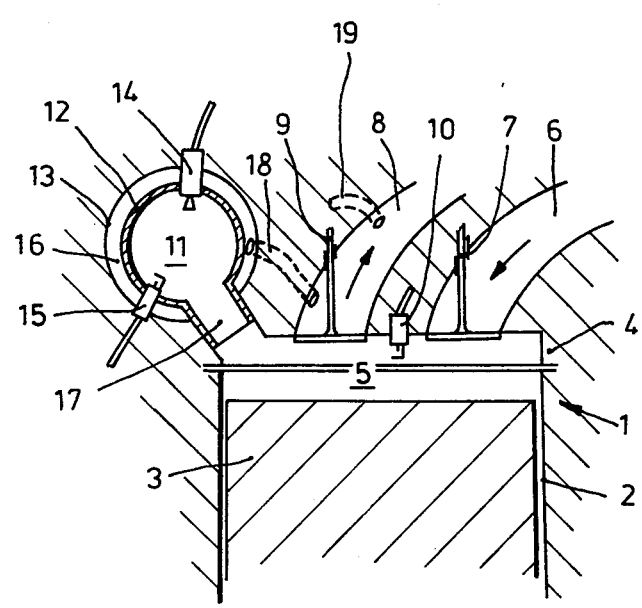

INTERNAL COMBUSTION ENGINE WITH A MAIN COMBUSTION CHAMBER AND AN AUXILIARY COMBUSTION CHAMBER

BACKGROUND OF THE INVENTION

The present invention relates essentially to an internal combustion engine wherein each combustion chamber includes a main combustion chamber and an auxiliary combustion chamber connected to the main combustion chamber, fuel being delivered in separate partial quantities to the main combustion chamber and the auxiliary combustion chamber.

Combustion chambers having a main combustion chamber and an auxiliary combustion chamber have heretofore operated in accordance with the charge stratification method. That method achieves charge stratification by dividing the combustion chamber into a main combustion chamber and an auxiliary combustion chamber and separately delivering fuel to the two combustion chambers. Thus, at the time of ignition, an ignitable, fuel-rich mixture is present in the vicinity of a spark plug located in the auxiliary combustion chamber, and a leaner charge is present in the remainder of the combustion chamber. The leaner charge may be adjusted to the most favorable operating conditions of the engine, and may consist of a fuel-lean mixture or even pure air. The charge stratification method is employed in internal combustion engines to achieve lower combustion peak temperatures resulting in comparatively low emissions of noxious substances in the exhaust gases.

SUMMARY OF THE INVENTION

It is an object of the present invention to provide an internal combustion engine having a main combustion chamber and an auxiliary combustion chamber which is capable of reducing noxious substances contained in exhaust gases of the internal combustion engine modifying the conventional charge stratification method.

This object, as well as other objects which will become apparent in the discussion that follows, are achieved, according to the present invention, by constantly maintaining the auxiliary combustion chamber at an elevated operating temperature and delivering to the auxiliary combustion chamber a partial quantity of an easily dissociable fuel. Because the easily dissociable fuel is introduced into the auxiliary combustion chamber which is maintained at an elevated operating temperature, the easily dissociable fuel is thermally dissociated into gaseous components prior to ignition of a fuel-air mixture in the main combustion chamber. Thus, the dissociated fuel can mix with the remainder of the fuel-air mixture and contribute to exhaust gases low in noxious substances.

In accordance with the present invention, the auxiliary combustion chamber is integrated into the internal combustion engine and the easily dissociable fuel is methanol, $CH_3OH$, which can be rather easily dissociated into hydrogen and carbon monoxide by thermal and/or catalytic reactions. Advantageously, the dissociation of methanol already takes place at a temperature of approximately 200° C, whereby a considerable portion of the methanol, depending on the pressure present, will be dissociated. The dissociation of the methanol can result in a somewhat larger yield of hydrogen if water is added to the methanol.

The temperature required for the dissociation of the methanol is attained by rendering the auxiliary combustion chamber heatable. In accordance with one embodiment of the present invention, the auxiliary combustion chamber is positioned within a cavity in a cylinder head of the internal combustion engine, the auxiliary combustion chamber comprising a thin-walled shell spacedly arranged from surrounding walls of the cylinder head to form an interspace. The auxiliary combustion chamber is heated by supplying the interspace with hot exhaust gases emitted from the main combustion chamber of the internal combustion engine. To improve the heat transfer from the exhaust gases to the auxiliary combustion chamber the thin-walled shell may be manufactured from a thermally conductive material. It should be noted that auxiliary combustion chambers of this type have been used in internal combustion engines operated with charge stratification to rapidly raise the auxiliary combustion chamber to an elevated operating temperature.

In accordance with one aspect of the present invention, delivery of the easily dissociable fuel may be achieved by a fuel injection nozzle projecting into the auxiliary combustion chamber. Alternatively, the auxiliary combustion chamber may be equipped with an auxiliary intake valve which is capable of delivering a fuel-air mixture containing the easily dissociable fuel. When the auxiliary intake valve is used, the easily dissociable fuel must be delivered by means of a special carburetor or an injection nozzle opening into an auxiliary intake conduit associated with the auxiliary intake valve.

Contrary to the internal combustion engines operated with charge stratification, another aspect of the present invention involves providing a spark plug in the main combustion chamber for igniting a cylinder charge located in the vicinity of the spark plug. The cylinder charge is created by permitting the combustible gas produced in the auxiliary combustion chamber during the intake and compression strokes to mix with the conventionally prepared fuel-air mixture present in the main combustion chamber. In order to supplement ignition of the cylinder charge and ensure complete combustion thereof, an auxiliary spark plug may be arranged in the auxiliary combustion chamber, and controlled to deliver an igniting spark in synchronization with the spark plug in the main combustion chamber.

Due to the variable portions of gaseous fuel in the cylinder charge, combustion of the cylinder charge results in a comparatively small quantity of noxious substances in the engine emissions. Another advantage of the present invention is that the reaction carburetors gasifying and dissociating fuels used with prior art internal combustion engines can be dispensed with, since the auxiliary combustion chamber operating at elevated temperatures in conjunction with the fuel dissociated at such temperatures form a reaction carburetor which is integrated into the internal combustion engine.

BRIEF DESCRIPTION OF THE DRAWING

For a further understanding of the present invention reference may be had to the accompanying drawing, in which the single FIGURE is a cross-sectional view through a cylinder head of an internal combustion engine having a main combustion chamber and an auxiliary combustion chamber in accordance with the present invention.

DESCRIPTION OF A PREFERRED EMBODIMENT

Referring now to the drawing, an internal combustion engine 1 includes a cylinder 2, a piston 3 slidably mounted in the cylinder 2, and a cylinder head 4. A main combustion chamber 5 delimited by the cylinder head 4 and the piston 3 has an intake conduit 6 controlled by a conventional intake valve 7 and an exhaust conduit 8 controlled by a conventional exhaust valve 9. A spark plug 10 is also arranged in the main combustion chamber 5.

In addition to the main combustion chamber 5, the internal combustion engine 1 includes an auxiliary combustion chamber 11 formed by a thin-walled shell 12 spacedly arranged from surrounding walls of a cavity 13 in the cylinder head 4. As shown, the auxiliary combustion chamber 11, which is connected to the main combustion chamber 5 by a connecting passage 17, may be provided with a fuel injection nozzle 14 for introducing an easily dissociable fuel, preferably methanol, into the auxiliary combustion chamber 11 and an auxiliary spark plug 15. An interspace 16 between the thin-walled shell 12 and the surrounding walls of the cavity 13 communicates through a supply conduit 18 with a front portion of the exhaust conduit 8 and through a return conduit 19 with a back portion, as viewed in the indicated direction of exhaust gas flow, of the exhaust conduit 8. In this manner, hot exhaust gases from the main combustion chamber 5 flow through the interspace 16 in direct heat exchange contact with the outer surface of the thin-walled shell 12, thereby heating the auxiliary combustion chamber 11.

In operation, a fuel-air mixture prepared in a conventional manner — e.g., by a carburetor or fuel injection into the intake conduit — is delivered to the main combustion chamber 5 during the intake stroke through the intake conduit 6, the fuel consisting of liquid or evaporated gasoline. In addition, the easily dissociable fuel, preferably methanol, is injected into the auxiliary combustion chamber 11 by the fuel injection nozzle 14. Since the auxiliary combustion chamber 11 is maintained at an elevated operating temperature due to its insulated support relative to the surrounding walls of the cavity 13 in the cylinder head 4 and/or its being heated by the hot exhaust gases emitted from the main combustion chamber 5, the methanol is dissociated in the auxiliary combustion chamber 11, whereby, depending on whether water is added to the methanol, the following reactions occur:

$$CH_3OH \rightarrow 2H_2 + CO;$$

or $$CH_3OH + H_2O \rightarrow 3H_2 + CO_2.$$

Both reactions are endothermic with an energy consumption of approximately 1000 kcal/kg which may be supplied by the hot exhaust gases.

The dissociated fuel gases produced in the auxiliary combustion chamber 11 have a larger volume than the fuel originally delivered thereto, and therefore pass through the connecting passage 11 and mix with the fuel-air mixture present in the main combustion chamber 5 to form an ignitable cylinder charge. Ignition of the entire cylinder charge is then initiated by the spark plug 10, the auxiliary spark plug 15 firing shortly before or after the spark plug 10 to ensure complete combustion of the entire cylinder charge. Due to the presence of the dissociated fuel gases, combustion of the entire cylinder charge occurs with relatively low generation of noxious substances, thereby reducing the quantity of noxious substances emitted into the environment.

Although heating of the auxiliary combustion chamber by the hot exhaust gases becomes rather intensive during the cold starting and the warming-up phase of the engine, any possible difficulties incurred during these operating stages, in spite of such heating, may be avoided by enriching the fuel-air mixture delivered to the main combustion chamber and delivering the methanol into the auxiliary combustion chamber only after the engine has reached higher operating temperatures.

It will be understood that the above described embodiment is merely exemplary and that persons skilled in the art may make many variations and modifications without departing from the spirit and scope of the invention. For example, the easily dissociable fuel may be contained in a fuel-air mixture which is delivered to the auxiliary combustion chamber by an auxiliary intake valve. Further it is possible to use methanol or another suitable fuel instead of the conventional gasoline also for generating the fuel-air-mixture present in the main combustion chamber.

The invention also can be advantageously used within an internal combustion engine utilizing conventional charge stratification and having only one spark plug in the auxiliary combustion chamber. In that case the easily dissociable fuel like methanol delivered to the auxiliary combustion chamber, which is maintained at an elevated operating temperature, and dissociated therein will also be ignited in the auxiliary combustion chamber. After the ignition a flame front of burning gases will then advance by way of the connecting passage into the main combustion chamber for the purpose of igniting the residual cylinder charge. All such modifications and variations are intended to be included within the scope of the invention as defined in the appended claims.

We claim:

1. In a spark ignited internal combustion engine including a main combustion chamber, an auxiliary combustion chamber connected to the main combustion chamber, and fuel delivery means for supplying separate partial quantities of fuel to the main combustion chamber and auxiliary combustion chamber; the improvement wherein:

the partial quantity of fuel delivered to the auxiliary combustion chamber is an easily dissociable fuel capable of substantial thermal dissociation at an elevated operating temperature; said improvement comprising means for constantly maintaining the auxiliary combustion chamber at the elevated operating temperature, and means, including the auxiliary combustion chamber, for dissociating the easily dissociable fuel, the main combustion chamber and the auxiliary combustion chamber being in continuous communication with each other so that prior to ignition of a fuel-air mixture in the main combustion chamber a predetermined amount of dissociated fuel mixes with the fuel-air mixture to contribute to exhaust gases low in noxious substances.

2. The internal combustion engine of claim 1, wherein the easily dissociable fuel is methanol.

3. The internal combustion engine of claim 1, wherein a predetermined quantity of water is delivered to the auxiliary combustion chamber with the easily dissociable fuel.

4. The internal combustion engine of claim 1, wherein the internal combustion engine further comprises a cylinder head having a cavity delimited by surrounding walls of the cylinder head; and wherein the auxiliary combustion chamber includes a thin-walled shell positioned in the cavity and spacedly arranged from the surrounding walls of the cylinder head of the internal combustion engine.

5. The internal combustion engine of claim 4, wherein the thin-walled shell is manufactured from a thermally conductive material, whereby the auxiliary combustion chamber is heatable.

6. The internal combustion engine of claim 5, wherein the auxiliary combustion chamber is heated with hot exhaust gases emitted from the internal combustion engine.

7. The internal combustion engine of claim 1, wherein the fuel delivery means comprises an injection nozzle communicating with the auxiliary combustion chamber for supplying the easily dissociable fuel thereto.

8. The internal combustion engine of claim 1, wherein the fuel delivery means comprises an auxiliary intake valve communicating with the auxiliary combustion chamber for delivering a fuel-air mixture containing the easily dissociable fuel to the auxiliary combustion chamber.

9. The internal combustion engine of claim 1, further comprising a spark plug provided in the main combustion chamber for igniting a cylinder charge comprising the separate partial quantities of fuel.

10. The internal combustion engine of claim 9, further comprising an auxiliary spark plug provided in the auxiliary combustion chamber for delivering an ignition spark in synchronization with the ignition of the spark plug of the main combustion chamber.

* * * * *